US006290814B1

(12) United States Patent
Rooff et al.

(10) Patent No.: US 6,290,814 B1
(45) Date of Patent: Sep. 18, 2001

(54) PAPER COATING COMPOSITION COMPRISING GELLAN GUM/STARCH BLEND

(75) Inventors: LuAnn E. Rooff, Castle Rock, CO (US); Catherine Bennett, Mason, OH (US); Frank J. Miskiel, San Diego, CA (US)

(73) Assignees: Penford Corporation, Bellevue, WA (US); Pharmacia Corporation, St. Louis, MO (US)

( * ) Notice: Subject to any disclaimer, the term of this patent is extended or adjusted under 35 U.S.C. 154(b) by 0 days.

(21) Appl. No.: 09/538,426

(22) Filed: Mar. 29, 2000

Related U.S. Application Data

(60) Provisional application No. 60/127,192, filed on Mar. 31, 1999, and provisional application No. 60/163,957, filed on Nov. 8, 1999.

(51) Int. Cl.$^7$ .................................................... D21H 11/00
(52) U.S. Cl. ......................... 162/175; 162/135; 162/178; 106/20
(58) Field of Search .................................. 162/135, 175, 162/178; 106/205.01, 206.1

(56) References Cited

U.S. PATENT DOCUMENTS 5,112,445  5/1992  Winston, Jr. et al. ............... 162/178

*Primary Examiner*—Peter Chin
(74) *Attorney, Agent, or Firm*—Marshall, O'Toole, Gerstein, Murray & Borun

(57) ABSTRACT

The present invention provides an improved method for sizing paper which comprises the step of coating paper with a composition comprising gellan gum and a derivatized starch wherein the derivatized starch and the gellan gum are present at a weight ratio of from 300:1 to 1000:1. Also provided by the invention are improved papers adapted for ink jet printing characterized by an ash content of from 5% to 30% by weight, permeability characterized by an HST score in the range of over 200 seconds and treated with a surface size comprising gellan gum and a derivatized starch wherein the derivatized starch and the gellan gum are present at a weight ratio of from 100:1 to 1000.

32 Claims, No Drawings

PAPER COATING COMPOSITION COMPRISING GELLAN GUM/STARCH BLEND

This application claims priority from U.S. Provisional Applications Ser. No. 60/163,957 filed Nov. 8, 1999 and Ser. No. 60/127,192 filed Mar. 31, 1999.

BACKGROUND OF THE INVENTION

The present invention relates to improvements in paper coating compositions for sizing paper. Surface sizing is the application of a non-pigmented coating to the surface of a paper web to seal up the sheet and improve the smoothness and strength of the surface of the paper for subsequent coating and/or printing.

The internal strength of paper is important for its intended use and for ease of manufacture. Increased internal bond strength is usually obtained by increasing the use of long length softwood pulp, a relatively expensive fiber, or by increased processing of the wood pulp by beating or refining the pulp to increase the fibrillation of the wood pulp which allows increased fiber to fiber bonding. This is an energy intensive step and depending on the amount of refining required, can be the rate determining step in the paper manufacturing process. Several chemical additives such as cationic starches have been used at the wet end of the paper machine for chemical enhancement of internal bond strength. It is difficult to retain 100% of these wet end chemical additives in the sheet and some are lost to the white water system resulting in poor chemical utilization.

Typical surface sizes comprise starches which can be used alone or in combination with hydrocolloids such as polyvinyl alcohol, carboxymethyl cellulose, wax emulsions and gums such as alginates. Preferred starches include those which have been chemically modified to prevent retrogradation following the cooking process. Suitable modified starches include those which are oxidized, substituted with cationic substituents, substituted with hydroxyalkyl ether substituents or are enzyme or acid thinned.

Winston, Jr. et al., U.S. Pat. No. 5,112,445 reports that a combination of gellan gum and starch demonstrates enhanced film formation on the surface of a coated paper sheet. The compositions disclosed by Winston, Jr. et al. comprise a hydroxyethyl starch ether in combination with a low-acyl gellan gum at weight ratios ranging from 80:1 to 160:1. Winston, Jr. does not teach starch/gellan gum ratios that enhance internal strength nor that affect size pickup levels. Nevertheless, there remains a desire in the art for improved surface sizing compositions providing improved properties.

The invention also relates to improvements in paper for use in ink jet printing. Ink jet printing is a non-impact digital printing process in which tiny droplets of ink are propelled from a nozzle to a paper surface without contact between the ink source and the surface. According to one type of ink jet printer, a piezoelectric element flexes one or more walls of a firing chamber which causes a pressure pulse and forces out a drop of ink. Some types of printers electrostatically charge the ink droplets and then use electric fields to deflect the droplets to a target spot on the paper or to a sump for recirculation.

Inks used for ink jet printing are frequently water based and are typically formulated to have lower viscosity than inks used for offset printing. Low viscosity is desired because less energy is required to pump and eject ink. One consequence of using low viscosity inks, however, is the undesirable tendency of the ink to "feather" (spread beyond the desired boundary) on the printed paper. The result is muddied undesirable printing.

The desire to better accommodate ink jet printing has led to the development of papers specifically formulated to reduce the tendency of ink jet ink to feather. One set of approaches has concentrated on the "coating side" of paper manufacture by modifying the surface sizes applied to the paper during manufacture. Some approaches use a size press to apply sizes comprising one or more of polyvinyl alcohol, starch, a surface sizing polymer emulsion such as Basoplast®, a styrene-acrylic emulsion or a high surface area silica pigment to change ink absorptivity or openness of the sheet. The amount of such materials applied to the paper surface during use is referred to as "pickup" or "add on" and can be expressed in terms of pounds per unit area or pounds per ton of finished paper. These methods are expensive and/or difficult to control. Alternative methods on the coating side involve the use of a blade or roll or air knife coater and the application of more pigment and a binder such as styrene-butadiene latex but such methods are extremely expensive.

An alternative set of approaches to produce improved papers for ink jet printing has focused on modifications made on the "wet end" side of paper production and involves the selection of sizes and pigments added during paper formation. Wet end sizes ASA (alkenyl succinic anhydride), AKD (alkyl ketene dimer) and rosin are hydrophobic materials and are typically added in order to slow the speed of ink penetration into the paper matrix. The liquid permeability of paper is measured in the art according to the Hercules Size Test (HST) in which the time for an aqueous dye preparation to penetrate a paper sample is measured in seconds. In general the higher the test result the better with respect to the resistance of the paper to feathering. Nevertheless, papers characterized by very high HST results are characterized by such a low absorption of ink that the ink tends to smear when contacted. While wet end sizes have been used to increase the HST results of papers for ink jet printing their use alone has not sufficiently improved the quality of paper for ink jet printing. Accordingly, there remains a need for improved papers for ink jet printing.

Related to the use of AKD as a size for wet end modification of paper is the incorporation of mineral filler particles, commonly referred to as "ash" to the wet end during paper manufacture. These fillers can include a variety of minerals such as calcium carbonate, clay, and titanium dioxide. Fillers improve the opacity and brightness of the resulting paper and also allow for the reduction of cellulose fiber content of the paper thus reducing the raw material expense in paper production. Unfortunately, as more ash is added to the paper more AKD or similar size should be added to the paper to counteract the increase in liquid absorption caused by incorporation of the filler. In addition, more starch and/or more long fiber cellulose need to be added to the paper matrix to maintain strength. Nevertheless, there remains a desire in the art for methods to increase levels of ash incorporation while maintaining desirable strength and printing properties.

SUMMARY OF THE INVENTION

The present invention relates to the discovery that a combination of gellan gum with derivatized starch when made into a solution and then applied to the surface of a paper during manufacture can enhance the internal properties of the paper including burst strength (Mullen) and internal bonding strength (Scott Bond). Improved surface sizing compositions may be prepared using higher ratios of derivatized starches to gellan gum than previously appreciated by the art. Specifically, it has been found that surface sizing compositions comprising the combination of a derivatized starch to gellan gum at a weight ratio of from 300:1 to 1000:1 and more preferably at a weight ratio of from 300:1 to 700:1 provide significantly improved physical properties to papers which are surface sized therewith compared to papers treated with surface sizes comprising much higher relative ratios of gellan gum. Additionally, these combinations show improved physical properties at lower pickup levels. Typically, lower pickup levels lead to poor print properties. Surprisingly, the print properties of the paper produced using the invention equal those of papers using higher pickup levels of traditional materials.

The modified starch used in the invention is selected from the group consisting of acid modified, enzyme modified, oxidized, cationic including cationic waxy, acetylated, hydroxyalkyl starches, preferably from the group consisting of hydroxyethyl and hydroxypropyl starches, and most preferably, hydroxyethyl starch. Particularly preferred hydroxyethyl starches are characterized by a hydroxyethyl substitution level of 0.9 to 2.15 percent by weight with a substitution level of 1.2 to 1.65 percent by weight being most preferred. Preferred derivatized starches are those which are slightly thinned and are characterized by RVA viscosities ranging from 400 cP to 1800 cP at 100° F. and 6 to 35 percent solids. RVA viscosities are measured using the Rapid Visco Analyzer (RVA), made by Newport Scientific Pty. Ltd., Warriewood, NSW 2102 Australia according to the general pasting method specified by the manufacturer. Those derivatized starches which are most preferred are slightly thinned and are characterized by RVA viscosities ranging from 500 to 1500 cP at 100° F. and 14 to 23 percent solids. Most preferred are thinned derivatized starches such as those commercially available from Penford Corporation (Cedar Rapids, Iowa) as Penford® Gum 260 and Penford® Gum 270 characterized by RVA viscosities ranging from 500 to 1500 cP at 100° F. and 17.5 percent solids. It is envisioned that all commercial starches including waxy, high amylose and genetically modified starches are suitable in this invention.

Suitable gellan gums for use according to the invention include the native polymer, the mildly deacylated polymer and the fully deacylated gellan gum polymer. Gellan gum is defined as the heteropolysaccharide produced by *Sphingomonas elodea* (ATCC 31461), which consists of a linear tetrasaccharide repeat unit consisting of glucose, glucuronic acid and rhamnose in the molar ratio of 2:1:1 and linked together with the fully acylated gellan gum molecule having an average one glycerate per repeat and one acetate per every two repeats. It is commercially available from Kelco Biopolymers, a group of Monsanto Company.

Surface sizes are also provided by the invention comprising gellan gum, a derivatized starch, and other conventional sizing additives which may include colorants, dispersants, surfactants, salts, sequestrants and the like, wherein the derivatized starch and the gellan gum are present at a weight ratio of from 300:1 to 1000:1 with a weight ratio of from 300:1 to 700:1 preferred.

As an additional aspect of the invention it has also been discovered that papers treated with surface sizes comprising gellan gum and a derivatized starch at a weight ratio of from 100:1 to 1000:1 provide particularly useful printing properties for ink jet printing when those papers are further characterized by an ash content of from 5% to 30% by weight (more preferably 8% to 25% by weight and most preferably 10% to 25% by weight), permeability characterized by an Hercules Size Test (HST) score over 200 seconds. Preferably the permeability is such that the HST is in the range of from 400 seconds to 2000 seconds and more preferably from 400 seconds to 1000 seconds.

Specifically, it has been found that papers produced according to the invention are characterized by particularly good ink jet printing properties according to the criteria of (1) solid color block uniformity (and particularly black, cyan and magenta); (2) solid color block intensity; (3) clarity/sharpness of black and blue circles; (4) fine grain mottle (mealiness) of green and red solid blocks; (5) reduced two-sidedness; and (6) reduced feathering in the "Bleed Test" area. While the use of starch/gellan blends in selected ratios are found to provide improvements in paper internal physical and strength properties according to the first aspect of the invention, it is found in this further aspect of the invention that the use of the starch/gellan blends provide improvements in the surface properties of the papers. These improvements in the surface properties, when combined with the wet end modifications of incorporating ash in the paper matrix at ranges of 10% to 25% by weight and adding levels of wet end sizing agents selected to provide the resulting paper with an HST of over 200 seconds, result in paper which is characterized by excellent ink jet printing quality. In particular, it has been found that sheets produced according to the methods of the invention are characterized by no feathering on either side when subjected to a pen and ink test which is used by those of skill in the art to predict ink jet printability. Moreover, practice of this aspect of the invention is capable of preventing feathering from ink jet printing while minimizing or even eliminating the use of sizing agents such as AKD and acrylonitrile butyl acrylate copolymer materials sold as Basoplast® (BASF Corp., Charlotte, N.C.).

According to practice of this aspect of the invention the derivatized starch and gellan gum are preferably present at a weight ratio of from 300:1 to 1000:1 with a ratio of from 300:1 to 700:1 being particularly preferred. The derivatized starch used in combination with the gellan gum is preferably selected from the group consisting of acid modified, enzyme modified, oxidized, acetylated, hydroxyethyl and hydroxypropyl starches with hydroxyethyl starch being particularly preferred. Preferred hydroxyethyl starches for use according to the invention are characterized by a substitution level of 0.9 to 2.15 percent by weight with a hydroxyethyl substitution level of 1.2 to 1.65 percent by weight being particularly preferred. The derivatized starch is also preferably thinned such as by acid or enzyme thinning and is preferably characterized by an RVA viscosity ranging from 500 to 1500 cP at 100° F. and 17.5 percent solids.

Methods of producing paper for ink jet printing according to the invention include those comprising the steps of incorporating ash into the paper in an amount such that the resulting paper is characterized by an ash content of from 10% to 25% by weight, incorporating sufficient size at the wet end of the paper machine such that the resulting paper is characterized by a Hercules Size Test (HST) score in the range of from 200 to 600 seconds, and coating the paper with a surface size comprising gellan gum and a derivatized starch wherein the derivatized starch and the gellan gum are present at a weight ratio of from 100:1 to 1000:1. While HST can be manipulated in a variety of manners known to those of ordinary skill in the art, a preferred method for doing so involves the incorporation of chemical sizes at the wet end including ASA (alkenyl succinic anhydride), AKD (alkyl ketene dimer) and rosin in amounts selected to provide a desired level of sizing. According to this aspect of the invention the use of AKD as a wet end size is particularly preferred.

DETAILED DESCRIPTION

As one aspect of the invention it has now been found that surface sizing solutions comprising selected ratios of gellan gum and a thinned modified starch migrates into the interior of paper sized therewith and provides significant and unexpected improvements to the internal strength of the paper composition. The incorporation of preferred gellan gum/hydroxyethyl starch sizing compositions to the formed sheet at the size press will result in increased internal strength and novel high strength paper and paper board products. This minimizes the energy required to make the sheet, and further minimizes the need for higher cost softwood pulp, potentially allowing faster production speeds of the paper machine by debottlenecking the process. The papermaker can potentially replace fiber with filler leading to reduced manufacturing costs while maintaining paper performance and/or produce new and/or different paper products. Additionally, 100% of the size composition is economically retained in the sheet during manufacture.

To prepare the sizing compositions of the invention, gellan gum and hydroxyethylated starch are dry blended and dispersed in water. While it is preferred to dry blend the components, the starch and the gellan gum can be cooked separately and blended prior to application. The starch/gellan gum composition can be cooked using traditional starch cooking methods familiar to those skilled in the art such as jet cooking, batch cooking and the like. The cooked paste is applied to the surface of a paper composition utilizing a conventional puddle size press or a metered film applicator to at a temperature no less than 130° F.

EXAMPLE 1

According to this example, various sizing compositions comprising an acid thinned hydroxyethyl starch (HES) available commercially as Penford® Gum 260 (characterized by a hydroxyethyl substitution of 1.45 to 1.65 percent by weight and RVA viscosity=1000 cP to 1500 cP at 100° F. and 17.5 percent solids) in combination with native acylated gellan gum available commercially as Kelcogel LT100 from Kelco Biopolymers at weight ratios of 300:1; 500:1; 1000:1 and at an infinite:1 ratio comprising no gellan gum were examined. The formulations were prepared by dry blending the hydroxyethyl starch and gellan gum and dispersing the blend in water. The slurry was then heated under constant mixing to 195° F. and cooked for from 30 to 45 minutes. After the cooking period was completed, the composition was allowed to cool to between 130° F. and 155° F. and applied to the surface of a paper composition utilizing a conventional puddle size press or a metered film applicator at various application rates. The resulting surface sized papers were then tested for burst strength (Mullen) and internal bonding strength (Scott Bond). The results were statistically normalized and are presented in Table 1 below. It was found that at application rates of 100 pounds size per ton paper a size composition utilizing the hydroxyethylated starch Penford® Gum 260 and the native gellan gum, the size composition characterized by a weight ratio of hydroxyethyl starch to gellan gum of 500:1 provides optimal Mullen burst strength and Scott bond strength. Similarly, a composition comprising the same hydroxyethyl starch to gellan gum at a ratio of 500:1 provides optimal physical properties as measured by Mullen and Scott bond at application rates of 200 pounds per ton compared to the compositions comprising ratios of 300:1 or 1000:1.

TABLE 1

Penford ® Gum 260
Formulation ratios are on a dry solids basis.

| Starch/Gellan | 300:1 | 300:1 | 300:1 | 500:1 | 500:1 | 500:1 | 1000:1 | 1000:1 | 1000:1 | Control | Control | Control |
|---|---|---|---|---|---|---|---|---|---|---|---|---|
| Pickup (Pounds/Ton) | 0 | 100 | 200 | 0 | 100 | 200 | 0 | 100 | 200 | 0 | 100 | 200 |
| Mullen (psi) | 20.50 | 39.68 | 58.86 | 20.44 | 49.97 | 79.50 | 22.53 | 37.14 | 51.75 | 0.6 | 9.0 | 17.4 |
| Scott Bond (ft lbs/1000 in$^2$) | 91.37 | 560.56 | 1029.75 | 74.68 | 729.16 | 1383.63 | 134.75 | 398.79 | 662.83 | −68.4 | 77.0 | 222.3 |

EXAMPLE 2

According to this example, various sizing compositions were prepared according to the method of Example 1 but comprising an acid thinned hydroxyethyl starch (HES) available commercially as Penford® Gum 270 (characterized by a hydroxyethyl substitution of 1.45 to 1.65 percent by weight and RVA viscosity=500 cP to 1000 cP at 100° F. and 17.5 percent solids) instead of the Penford® Gum 260 characterized by an RVA viscosity of 1000 cP to 1500 cP at 100° F. and 17.5 percent solids. The resulting sized papers were evaluated according to the method of Example 1 for burst strength and internal bonding strength with the statistically normalized results presented in Table 2 below. These results demonstrate that at application rates of both 100 pounds per ton of paper and 200 pounds per ton of paper, the composition comprising the Penford® Gum 270 starch and native Gellan gum provides optimal improvements of Mullen burst and Scott Bond strength at derivatized starch to gellan weight ratios of 300:1.

TABLE 2

Penford ® Gum 270
Formulation ratios are on a dry solids basis.

| Starch/Gellan | 300:1 | 300:1 | 300:1 | 500:1 | 500:1 | 500:1 | 1000:1 | 1000:1 | 1000:1 | Control | Control | Control |
|---|---|---|---|---|---|---|---|---|---|---|---|---|
| Pickup (Pounds/Ton) | 0 | 100 | 200 | 0 | 100 | 200 | 0 | 100 | 200 | 0 | 100 | 200 |
| Mullen (psi) | 26.49 | 41.96 | 57.43 | 27.63 | 36.84 | 46.05 | 24.00 | 33.40 | 42.79 | −1.4 | 6.7 | 14.8 |
| Scott Bond (ft lbs/1000 in$^2$) | 185.52 | 556.62 | 927.73 | 107.23 | 463.63 | 820.03 | 163.6 | 411.16 | 658.67 | −242.6 | 62.7 | 368.1 |

EXAMPLE 3

According to this example, various sizing compositions were prepared according to the method of Example 1 but comprising an acid thinned hydroxyethyl starch (HES) available commercially as Penford® Gum 280 (characterized by a hydroxyethyl substitution of 1.45 to 1.65 percent by weight and RVA viscosity=400 cP to 1150 cP at 100° F. and 23 percent solids) instead of the less thinned Penford® Gum 260 and Penford® Gum 270 described in the previous examples. The resulting sized papers were evaluated according to the method of Example 1 for burst and internal bonding strength with the statistically normalized results presented in Table 3 below. These results suggest that there may not exist an optimum application rate or derivatized starch to gellan gum ratio in which enhanced burst and/or internal bonding strength were observed with the composition comprising the lower viscosity Penford® Gum 280.

EXAMPLE 4

According to this example, various sizing compositions were prepared according to the method of Example 1 but comprising an acid thinned hydroxyethyl starch (HES) available commercially as Penford® Gum 270 (characterized by a hydroxyethyl substitution of 1.45 to 1.65 percent by weight and RVA viscosity=500 cP to 1000 cP at 100° F. and 17.5 percent solids). The resulting sized papers were evaluated according to the method of Example 1 for burst strength and internal bonding strength. Actual pickup, Mullen and Scott Bond results are presented in Table 4 below. These results demonstrate that the composition comprising the Penford® Gum 270 starch and native gellan gum provide equal or improved Mullen and Scott Bond strength results at significantly lower pickup rates.

TABLE 3

Penford ® Gum 280
Formulation ratios are on a dry solids basis.

| Starch/Gellan | 300:1 | 300:1 | 300:1 | 500:1 | 500:1 | 500:1 | 1000:1 | 1000:1 | 1000:1 | Control | Control | Control |
|---|---|---|---|---|---|---|---|---|---|---|---|---|
| Pickup (Pounds/Ton) | 0 | 100 | 200 | 0 | 100 | 200 | 0 | 100 | 200 | 0 | 100 | 200 |
| Mullen (psi) | 22.36 | 30.18 | 38.00 | 22.39 | 30.55 | 38.70 | 29.00 | 33.13 | 37.26 | −1.4 | 8.4 | 18.2 |
| Scott Bond (ft lbs/1000 in$^2$) | 100.36 | 225.58 | 350.79 | 114.36 | 236.97 | 359.57 | 21.54 | 285.01 | 308.48 | −294.2 | 24.0 | 342.3 |

TABLE 4

Penford ® Gum 270
Formulations on a ratio are on a dry solids basis

| Starch/Gellan | 300:1 | 300:1 | 300:1 | 500:1 | 500:1 | 500:1 | Control | Control | Control |
|---|---|---|---|---|---|---|---|---|---|
| Pickup (Pounds/Ton) | 65 | 55 | 22 | 88 | 41 | 55 | 149 | 90 | 73 |
| Mullen (psi) | 28.2 | 28.8 | 26.0 | 38.3 | 34.6 | 28.0 | 37.0 | 33.7 | 29.7 |
| Scott Bond (ft. lbs/1000 in$^2$) | 227 | 185 | 147 | 321 | 209 | 137 | 275 | 201 | 152 |

EXAMPLE 5

According to this example, various papers were manufactured according to the second aspect of the invention to determine the parameters important to printing performance by ink jet printing. The parameters of (1) surface sizings; (2) ash content at the wet end; and (3) HST scores were varied in the manufacture of trial papers and were compared with ink jet printability performance for those papers. Surface sizing parameters which were compared included identity and viscosity of the thinned derivatized starch. For example, different commercially available hydroxyethyl starches (Penford® Gums 260, 270 and 280, respectively PG260, PG270 and PG280) characterized by different thinning levels were compared. These thinned derivatized starches were compared in the presence and absence of gellan gum and at different ratios of gum to derivatized starch.

The papers were printed using a commercially available ink jet printer and a 1991 Hewlett Packard ink jet printability test form and were visually compared using the criteria of (1) solid color block uniformity (and particularly black, cyan and magenta); (2) solid color block intensity; (3) clarity/sharpness of black and blue circles; (4) fine grain mottle (mealiness) of green and red solid blocks; (5) reduced two-sidedness; and (6) reduced feathering in the "Bleed Test" area. The papers were then ranked from best to worst as set out in Table 5 below.

As set out in the table the printability of the samples ranked 1–3 was quite good. There was a step change observed in the fine grain mottle of the green and red solid blocks in samples 4–10. Color intensity of the solid black block was extremely poor for those ranked 11–13. The results show that the ink jet printability of the trial paper was dependent on a combination of (1) the presence of gellan gum in the surface size with the optimum ratio of starch to gellan of 500:1. In addition, printability was better on papers with ash levels in the range of 11% to 14% by weight. Further optimum printability was obtained with HST values ranging from about 400 to 600 seconds.

TABLE 5

Ink Jet Printability Ranking of Trial Paper
1 = Best   13 = Worst

| Rank (Best to Worst) | Starch | Starch:Gellan Ratio | % Ash | HST (Seconds) | Pick Up (lb./Ton) |
|---|---|---|---|---|---|
| 1 | PG260 | 500:1 | 13.10 | 442 | 63.4 |
| 2 | PG260 | 300:1 | 11.31 | 455 | No Data |
| 3 | PG260 | 500:1 | 12.60 | 518 | No Data |
| 4 | PG260 | 300:1 | 14.57 | 224 | No Data |
| 5 | PG260 | 500:1 | 9.03 | 234 | 80.1 |
| 6 | PG260 | Control | 1.33 | 348 | 59.7 |
| 7 | PG260 | Control | 6.27 | 207 | 148.7 |
| 8 | PG260 | 300:1 | 4.21 | 587 | 22.6 |
| 9 | PG260 | 500:1 | 2.60 | 310 | 40.9 |
| 10 | PG280 | Control | 2.70 | 376 | 113.6 |
| 11 | PG280 | Control | 14.01 | 316 | 83.7 |
| 12 | PG280 | Control | 12.19 | 91 | 61.7 |
| 13 | PG260 | Control | 14.70 | 419 | 76.8 |

Numerous modifications and variations in the practice of the invention are expected to occur to those skilled in the art upon consideration of the presently preferred embodiments thereof. Consequently, the only limitations which should be placed upon the scope of the invention are those which appear in the appended claims.

What is claimed is:

1. A method for sizing paper which comprises the step of coating paper with a composition comprising gellan gum and a derivatized starch wherein the derivatized starch and the gellan gum are present at a weight ratio of from 500:1 to 1000:1.

2. The method of claim 1 wherein the derivatized starch and gellan gum are present at a weight ratio of from 500:1 to 700:1.

3. The method of claim 1 wherein the derivatized starch is selected from the group consisting of acid modified, enzyme modified, oxidized, acetylated, hydroxyethyl and hydroxypropyl starches.

4. The method of claim 3 wherein the derivatized starch is a hydroxyethyl starch.

5. The method of claim 1 wherein the gellan gum is selected from the group consisting of native fully acylated, partially acylated and fully deacylated.

6. The method of claim 1 wherein the derivatized starch is thinned.

7. The method of claim 6 wherein the thinned derivatized starch is characterized by an RVA viscosity ranging from 500 to 1500 cP at 100° F. and 17.5 percent solids.

8. A surface size for sizing paper comprising gellan gum, a derivatized starch, and water wherein the derivatized starch and the gellan gum are present at a weight ratio of from 500:1 to 1000:1.

9. The surface size of claim 8 wherein the derivatized starch and gellan gum are present at a weight ratio of from 500:1 to 700:1.

10. The surface size of claim 8 wherein the derivatized starch is selected from the group consisting of acid modified, enzyme modified, oxidized, acetylated, hydroxyethyl and hydroxypropyl starches.

11. The surface size of claim 10 wherein the derivatized starch is a hydroxyethyl starch.

12. The surface size of claim 8 wherein the gellan gum is selected from the group consisting of native fully acetylated, partially acetylated and fully deacylated.

13. The surface size of claim 8 wherein the derivatized starch is thinned.

14. The surface size of claim 13 wherein the derivatized starch is characterized by an RVA viscosity ranging from 500 to 1500 cP at 100° F. and 17.5 percent solids.

15. Paper adapted for ink jet printing characterized by an ash content of from 5% to 30% by weight, Hercules Size Test (HST) permeability characterized by an HST in the range of from 200 seconds to 2000 seconds and treated with a surface size comprising gellan gum and a derivatized starch wherein the derivatized starch and the gellan gum are present at a weight ratio of from 500:1 to 1000:1.

16. The paper of claim 15 wherein the HST is in the range of from 400 seconds to 2000 seconds.

17. The paper of claim 15 wherein the paper is characterized by an ash content of from 8% to 25% by weight.

18. The paper of claim 15 wherein the derivatized starch and gellan gum are present at a weight ratio of from 500:1 to 1000:1.

19. The paper of claim 15 wherein the derivatized starch and gellan gum are present at a weight ratio of from 500:1 to 700:1.

20. The paper of claim 15 wherein the derivatized starch is selected from the group consisting of acid modified, enzyme modified, oxidized, acetylated, hydroxyethyl and hydroxypropyl starches.

21. The paper of claim 15 wherein the derivatized starch is a hydroxyethyl starch.

22. The paper of claim 15 wherein the gellan gum is selected from the group consisting of native fully acylated, partially acetylated and filly deacylated.

23. The paper of claim 22 wherein the derivatized starch is thinned.

24. The paper of claim 22 wherein the thinned derivatized starch is characterized by an RVA viscosity ranging from 500 to 1500 cP at 100° F. and 17.5 percent solids.

25. A method of making paper comprising the steps of incorporating ash into the paper in an amount such that the resulting paper is characterized by an ash content of from 10% to 14% by weight, incorporating sufficient size at the wet end of the paper machine such that the resulting paper is characterized by a Hercules Size Test (HST) result of over 200 seconds, and coating the paper with a surface size comprising gellan gum and a derivatized starch wherein the derivatized starch and the gellan gum are present at a weight ratio of from 500:1 to 1000:1.

26. The method of claim 25 wherein AKD is incorporated as a size at the wet end of the paper machine.

27. The method of claim 25 wherein the derivatized starch is selected from the group consisting of acid modified, enzyme modified, oxidized, acetylated, hydroxyethyl and hydroxypropyl starches.

28. The method of claim 25 wherein the derivatized starch is a hydroxyethyl starch.

29. The method of claim 25 wherein the gellan gum is selected from the group consisting of native fully acylated, partially acylated and fully deacylated.

30. The method of claim 25 wherein the derivatized starch is thinned.

31. The method of claim 30 wherein the thinned derivatized starch is characterized by an RVA viscosity ranging from 500 to 1500 cP at 100° F. and 17.5 percent solids.

32. The method of claim 25 wherein the resulting sheet is characterized by no feathering on either side when subjected a pen and ink test.

* * * * *

UNITED STATES PATENT AND TRADEMARK OFFICE
CERTIFICATE OF CORRECTION

PATENT NO. : 6,290,814 B1
DATED : September 18, 2001
INVENTOR(S) : Rooff et al.

Page 1 of 1

It is certified that error appears in the above-identified patent and that said Letters Patent is hereby corrected as shown below:

<u>Column 10,</u>
Line 67, replace "filly" with -- fully --

Signed and Sealed this

Seventh Day of May, 2002

Attest:

Attesting Officer

JAMES E. ROGAN
*Director of the United States Patent and Trademark Office*